United States Patent [19]

Höfling et al.

[11] 3,960,622

[45] June 1, 1976

[54] METHOD OF MAKING STRIP-SHAPED MULTIPLE CONDUCTOR

[75] Inventors: Erich Höfling; Hanspeter Breu, both of Kreuzlingen, Switzerland

[73] Assignee: Swiss Aluminium Ltd., Chippis, Switzerland

[22] Filed: June 14, 1973

[21] Appl. No.: 369,797

[30] Foreign Application Priority Data

June 16, 1972 Switzerland ........................ 9105/72

[52] U.S. Cl. ........................................ 156/3; 156/12; 156/48; 156/51; 156/244; 156/268; 174/52 PE; 204/129.65; 264/272

[51] Int. Cl.[2] ........................................ C23F 1/02

[58] Field of Search ................. 156/3, 8, 11, 12, 48, 156/51, 293, 303.1, 253, 268, 270, 244; 264/272; 204/129.1, 129.55, 129.65; 174/52 PE, 68.5; 29/625; 317/101

[56] References Cited

UNITED STATES PATENTS

| | | | |
|---|---|---|---|
| 2,607,825 | 8/1952 | Eisler | 156/3 X |
| 3,313,013 | 4/1967 | Last | 156/17 X |
| 3,380,863 | 4/1968 | Silberberg | 156/12 |
| 3,536,545 | 10/1970 | Traynor et al. | 156/8 X |
| 3,580,737 | 5/1971 | Traynor | 156/8 X |
| 3,607,474 | 9/1971 | Hensdale | 156/3 |
| 3,706,840 | 12/1972 | Moyle et al. | 264/272 X |

OTHER PUBLICATIONS

IBM Technical Disclosure Bulletin, vol. 11, No. 8, Jan. 1969, Altering Circuit Connections by R. R. Rodite, p. 896.

*Primary Examiner*—William A. Powell
*Attorney, Agent, or Firm*—Ernest F. Marmorek

[57] ABSTRACT

Method of making a strip-shaped multiple electric conductor, comprising the steps of, providing a strip of electrically conducting material, applying a first layer of insulating material to one wide side of the strip and a second layer of insulating material to the other wide side of the strip, providing in the first layer along the strip at least one groove penetrating so far as to expose the conducting material, removing the exposed conducting material as far as the second layer, so as to form at least one longitudinal cavity in the strip, and filling the cavity and the groove with an insulating material.

8 Claims, 7 Drawing Figures

METHOD OF MAKING STRIP-SHAPED MULTIPLE CONDUCTOR

Figure 1:
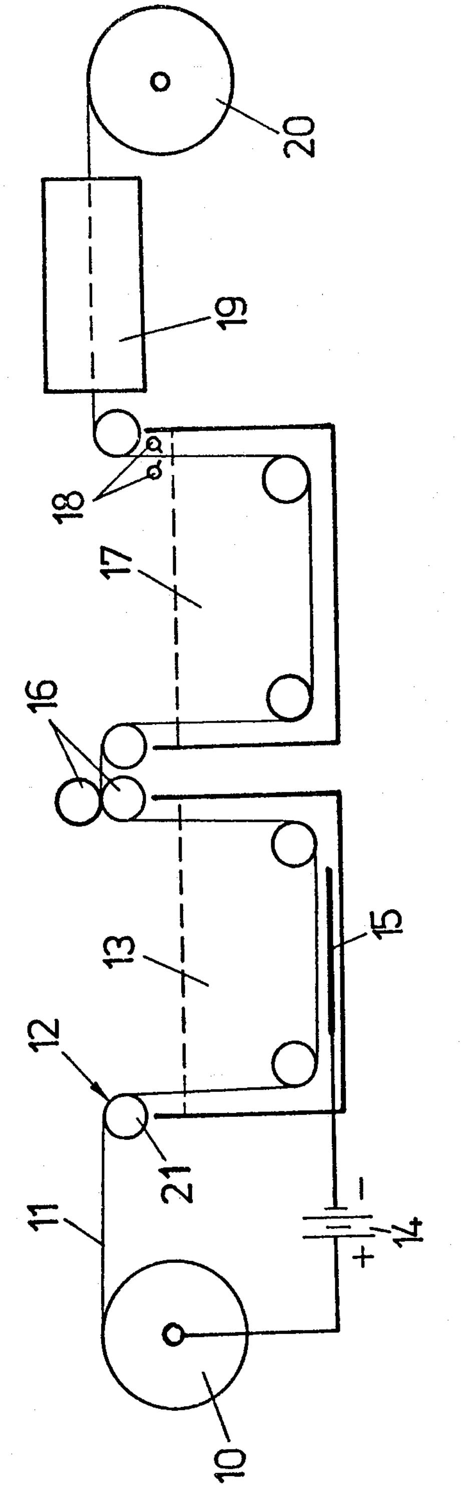

The invention concerns a process for the manufacture of insulated electrical conductors, in particular strip-shaped multiple conductors.

Inductor coils, transformers, chokes, magnets etc. are usually made with wire windings, but are also made with strip-shaped conductors. In the case of strip shaped conductors, aluminum is used by preference and copper is seldom employed. Aluminum and also copper strips are insulated by the insertion of strip-shaped insulating materials, e.g. paper, polyester foils, etc., or strips insulated with lacquer with specially treated longitudinal edges are used, or anodically oxidised strips.

When compared with windings of copper wire, these conductor strips consisting of aluminum exhibit the advantages of better removal heat and less weight. Their disadvantage on the other hand is that the proportion of insulating material by volume is relatively large in comparison to round wire. This is due to the lower specific conductivity of aluminum in comparison with copper. Furthermore the surface of a round aluminum wire will exhibit 1.6 times the surface area of a copper wire of the equivalent conductivity, and correspondingly the absolute quantity of insulating material required, related to the conductivity, will also increase. These physical properties of the materials being compared cannot be changed. For conductor strips however it is an unfavourable circumstance that, among all imaginable cross section shapes, round wire compared with strip shaped conductors possesses a minimum surface area with a correspondingly more favourable ratio of insulating material. In the case of strip shaped conductors the surface to volume ratio is less favourable, the more the breadth is increased and the thickness decreased for a given cross section. As a logical consequence therefore the breadth of the conductor strip should be reduced and the thickness correspondingly increased but, however, because of practical considerations this is not possible, since a lower limit is set to the trouble-free workability of individual strips in thicknesses of e.g. 50–100/1000 mm with a width of approx. 20–30 mm. Smaller cross sections of aluminum than 1–1.5 $mm^2$ cannot be produced with the present known technologies.

The object of the present invention is a method for the manufacture of electrical conductors, in particular multiple conductors having smaller breadths and cross sections than produced up to now in order to achieve, in relation to round wires, similar favourable ratios of insulation to conductor volume.

According to the invention this objective is achieved in that an electrically conductive strip of material is provided with a layer of an insulating material at least on its wide sides, on one wide side of the strip of material the insulating layer is provided with at least one groove penetrating so far as to expose the electrically conductive strip of material, the exposed electrically conductive material is removed up to the layer opposite to the groove, and thereafter the recess formed by the groove and the removed electrically conductive material is filled with an insulating material. By these measures in accordance with the invention, a strip can be provided with a plurality of grooves running parallel to each other on its wide side, which have a distance between them, for example corresponding to the thickness of the strip, so that individual conductors of rectangular cross section arise as a result, which with regard to the necessary insulating material have approximately the same favourable ratio as a round wire. The main difficulty in manufacturing polygonal individual conductors lay hitherto in the difficulty of their manufacture by mechanical means. These difficulties are removed by means of the invention insofar as this time simple mechanical actions have to be applied, e.g. in the form of cutting the insulating material, by the application of small cutting forces.

The removal of the exposed conductor material under the slit, as far as the opposite insulation layer, can occur by chemical or preferably by electrochemical means. For this last purpose the strip to be treated is placed in an electrolyte having a direct current flowing through it. An electrode immersed in the bath is then made negative and the material to be treated is made positive. The flow of current between the strip and the electrode produces an oxidation and at the same time with a suitable electrolyte a dissosultion of the metal conductor material at the places previously determined by the cutting operation.

The insulation of the individual conductors lying side by side, manufactured in this way, is achieved by introduction of an insulating material in the recess produced by the cutting operation in the insulating layer and by the electrolytic removal in the metallic conducting material, so that the conductors are insulated from each other. Also the edges of the main strip may be insulated in the same operation. A lacquer, dissolved in a solvent, and thereafter dried and baked, has been shown to be an appropriate insulation to be applied. In many cases it can be preferable to introduce an insulating material of an organic polymer in the form of a cross-linking resin into the recesses and to allow it to harden under the influence of heat.

There are applications in electrical engineering where it is expedient to cover a multiple conductor, made in accordance with the invention, thereafter with a further coating of a thermoplastic synthetic resin, which can more suitably be carried out by extrusion coating.

Below are set out some examples referring to the process according to the invention,

Example 1

A strip was formed with the following construction: A strip of aluminum 98.3, soft, of thickness 7/1000 mm was coated on one wide side with 4g/$m^2$ of polyvinylbutyral phenolic resin electro-insulating lacquer. On the other wide side of the strip a 6.25/1000 mm polyester foil was applied with the aid of an adhesive. The quantity of adhesive amounted to 2–3 g/$m^2$.

The strip manufactured in this way had a breadth of 60 mm and was cut through, with a scoring device, on the lacquered side at places running parallel to each other, so that 12 narrow strips each 5 mm wide resulted. The strip was placed in an etching bath, consisting of 3% hydro-boro-fluoric acid, 0.2% hydrochloric acid, the rest water. The removal of the metal at the edges of the strip and at the scored lines took place anodically in this bath, at an etching voltage of 25 V and an etching current of 25 amp. The breadth of removal amounted to approximately 0.1 mm and, after the removal of metal had progressed to the opposite polyester foil, the strip was rinsed with tap water and deionised water. Thereafter the treated side of the strip was brushed to remove the edges of lacquer projecting over the etched groove, and then these grooves resulting during etching were filled up again with an electrically insulating lacquer, either directly by electrophoretic precipitation of lacquer, or, after drying, by conventional lacquer deposition by means of rollers, and the lacquer then baked. In order to obtain comparative values of dielectric strength against A.C., for individual conductors not insulated from one another and insulated from one another, the strip was rolled up before filling with an insulating material and a dielectric strength against A.C. of 500 V was measured for the strip in this condition. After the strip had been again fully insulated, it was rolled up in the same way and then a dielectric strength against A.C. or 700 V was reached.

Example 2

A strip with the construction 10 g/m² epoxy resin lacquer on one wide side, an aluminum core of 10/1000 mm thickness and a layer of polypropylene of 12.5/1000 mm thickness on the other wide side, the polypropylene layer being fixed to the other wide side of the aluminum core with 2–3 g/m² of adhesive, was converted into a multiple conductor as follows. With the aid of a scoring device, the starting strip 49 mm wide was scored on six parallel lines on the side provided with the epoxy resin lacquer, using tools similar to razor blades, down to the aluminum core, in strips 7 mm wide. Then the strip was led through an electrolytic bath of the same composition as the etching bath, and provided with an anode. In the subsequent etching bath having a composition of 5% common salt, 0.5% hydrochloric acid and 0.5% chromium (III) chloride, in which a cathode is present, the metal at the scored lines and at the edges of the strip was etched away over a width of 0.2–0.3 mm. The etching voltage amounted to 35 V and an etching current of 35 Amp was employed. The treatment time amounted to approx. 15 sec. Then at the end of the treatment according to the invention a dielectric strength of 700–800 V was reached.

Example 3

A metal strip with the construction 12 g/m² Desmodur-Desmophene electro-insulating lacquer on one wide side, an aluminum core of 250/1000 mm thickness, and a polyethylene layer 50/1,000 mm on the other wide side which was fixed to the core with a layer of adhesive of 3–5 g/m², was converted into a multiple conductor as follows:

The insulating lacquer was scored through to the metal in five lines in a continuous operation with a scoring device. For a total width of the strip of 42 mm there thus resulted 6 strips each 7 mm broad. The metal at the edges and at the scored lines was etched away anodically over a width of 0.3–0.5 mm in an etching bath with the composition 30% common salt and 0.1% hydrochloric acid, with an etching voltage of 30 V and an etching current of 75 Amp. As in example 2 the current supply was achieved by electrolytic coupling. The conductor strip treated in this way exhibited a dielectric strength of 700 V.

Example 4

A strip with the construction 8 g/m² polyvinylformal Phenolic resin insulating lacquer on one wide side, a copper core with thickness of 10/1000 mm, and on the other wide side a 12.5/1000 mm polyester foil, which was fixed by 2–3 g/m³ of a coating material, was converted into a multiple conductor as follows. The strip, 36 mm broad, in a continuous process using a scoring device which scored through the lacquer down to the metal, was divided into 6 strips each 6 mm broad. After passing continuously through a first anodically connected electrolytic bath (30% NaCl solution) the strip ran into the etching bath having the cathode and of the composition 5% hydro-boro-fluoric acid, 0.5% common salt, the rest water. In this etching bath there was electrolytic removal at the scored lines and at the edges of the core over a width of 0.2–0.3 mm. After subsequent rinsing, the strip was dried and, as in Example 1, which is valid also for Examples 2 and 3, the insulation was completed. With this strip a dielectric strength of 1000 V was achieved.

The following electrolytes are preferred for producing the results according to the invention. First an electrolyte consisting of an aqueous solution of 5–30%, preferably 8–12%, NaCl; 0–1.0%, preferably 0.4–0.6, $CrCl_3$; and 0–2.0, preferably 0.2–0.5, HCl. An electrolyte of this kind was used with the performance of the process according to Examples 2 and 3. A further electrolyte, to be used preferably, consists of an aqueous solution of 1.0–5.0, preferably 2.5–3.5%, HBF4; and 0–1.0% preferably 0.2–0.3%, HCl or NaCl. An electrolyte from the specifications just mentioned was used with the process according to the Example 1 and 4. Furthermore good results were achieved with an electrolyte which was composed of an aqueous solution of 5–25%, preferably 15–20%, tetra-methyl ammonium chloride; and 0–1.0, preferably 0.2–0.3, NaCl or HCl.

A multiple conductor manufactured in accordance with the invention is characterised in that it includes at least two conductor strips lying side by side completely embedded in insulating material and joined together by the insulating material. In a suitable development a carrier material, e.g. a plastic film, can then be provided on one wide side of the multiple conductor, and on the other side an insulating material of another type, e.g. an insulating lacquer coating, while the recesses between the individual conductors are filled up with an insulating lacquer or a synthetic resin. In order to give the conductor an increased resistance to external influences e.g. of a mechanical or thermal nature, the conductor is furthermore advantageously developed, in that it is provided with a covering consisting of a thermoplastic synthetic resin. In conductors of this kind, aluminum is to be preferred as the electrically conductive material, in the case of the presence of more special electrical requirements, copper or another electrically conductive material can be selected as core material.

Apart from the fact that the smaller widths of the individual conductors, which can be achieved by the invention, for corresponding increased thickness of the same, allow very favourable ratios of insulation volume to conductor volume to be achieved, there is furthermore the advantage that such multiple conductors, on winding into spools, provide as many turns per revolution as the multiple conductor contains individual conductors. For this reason by corresponding choice of the number of individual conductors, savings of up to 95% in winding time can be made.

A further advantage is that a multiple conductor can contain individual conductors of various breadths. For this reason and because the individual windings can be connected not only in series, that is by suitable connections from outside and inside ends, but also parallel or group-wise in series, it results that primary and secondary windings or also several primary and secondary windings can be contained in a conductor strip. It is obvious that the production of induction coils with several windings is very much simplified since only a single winding process needs to be undertaken.

The employment of the described multiple conductor strips is however not limited only to the manufacture of induction coils. They can also be put to use as so called flat conductors e.g. for heating elements with large surface area, for house wiring, telephone lines or similar things. In this last case several multiple conductor strips can be laid one on top of the other and joined together by means of a single- or multi-component glue or with thermoplastics by means of extrusion.

In the following a particularly suitable device for carrying out the process is explained in more detail with help of schematic drawings.

Figure 2:
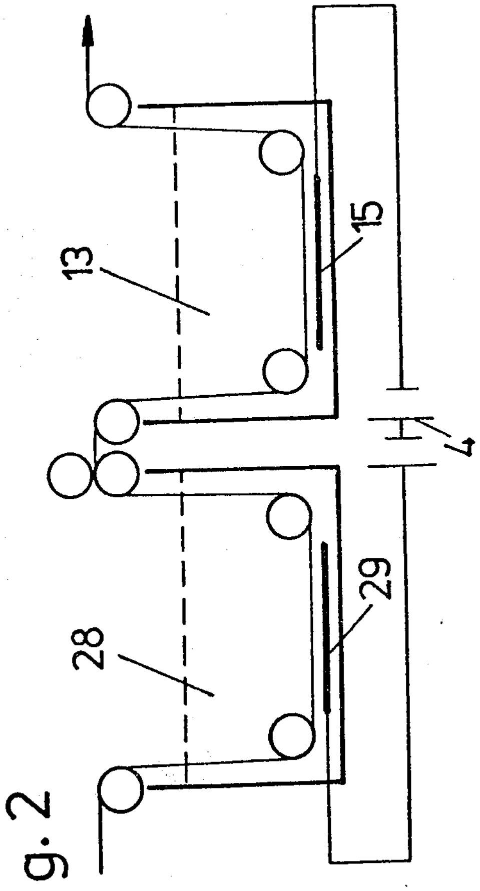

FIG. 1 shows the device in side view;

FIG. 2, a version of the device in which an electrolytic coupling takes place;

FIG. 3, 4, 5, 6 and 7 a multiple conductor strip at various stages of manufacture.

Figure 3:
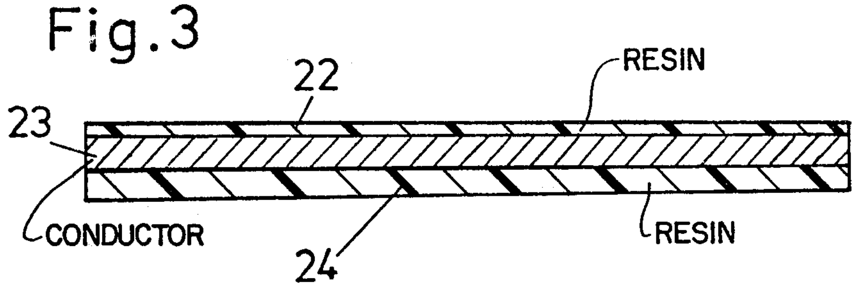
Figure 4:
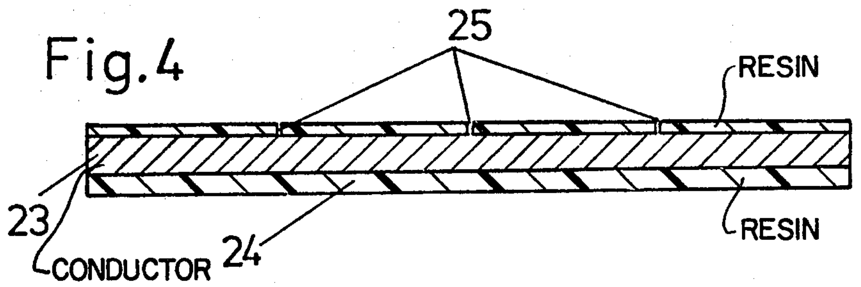
Figure 5:
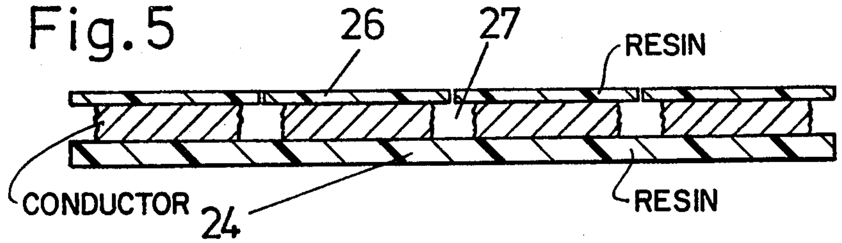

From the unwinding roll 10 there runs a multiple conductor strip, which is constructed in cross section as shown in FIG. 3. A metal strip 23 is covered on both sides with an insulating material. On one side there is an insulating lacquer 22 and on the opposite side an insulating carrier film 24, as is explained in greater detail in examples 1–4. The multiple conductor strip runs from the unwinding roll 10 onto a first deflection roll 21, from which it enters into an etching bath 13. Above the first deflection roll 21 there is a scoring device, for example in the form of a knife, which cuts into the insulating lacquer in the manner shown in FIG. 4, as far as the metal strip 23 to form insulating portions 26. In the etching bath 13 the etching medium penetrates the scored lines 25 shown in FIG. 4 and removes metal in the form of a tunnel, so that etched-out cavities 27 shown in FIG. 5 arise, while between each two etched out cavities 27 there remains an individual conductor. Furthermore along the long edges of the multiple conductor strip the small side of the metal strip is etched away.

From the etching bath 13 the multiple conductor strip 11 enters a rinsing bath 17 to remove the electrolyte. In order to prevent an excessive entry of electrolyte into the rinsing bath 17, the multiple conductor strip 11 previously runs through squeezing rolls 16. From the rinsing bath 17 the conductor 11 runs onto a winding-up roll 20. Before this the conductor first undergoes drying inside the drier 19. So that the contents of the rinsing bath 17 do not come to be dried onto the conductor 11, the strip 11 is cleaned with water emerging from spray nozzles 18.

On grounds of clarity, the part of the apparatus with which the insulating material can be deposited on the metal strip, and the device associated with the winding-up roll 20 for filling the etched-out cavities with an insulating material, were omitted. Furthermore only a single scoring device 12 was shown above the deflecting roll 21. It is to be understood that above the wide side of the strip several scoring devices can be arranged side by side, spaced apart either at equal or differing distances, according to whether a multiple conductor strip with individual conductors of equal or unequal cross sections is desired. In place of a scoring device, burning out by means of a continuously operating gas laser may be employed. Instead of the scoring device or gas laser, the strip 11 can be provided on one side with an insulating foil and on the other side with a strip-shaped printing of an insulating lacquer layer. The removal of the metal by dissolution to provide the etched-out cavities 27, later filled with an insulating material, takes place in accordance with the invention electro-chemically. For this purpose an electrode 15 dips into the electrolyte, and the electrode is connected to the negative pole of a direct current source 14. The positive pole of the direct current source is brought into electrical connection with the strip to be treated through the body of the apparatus e.g. through the bearings of the unwinding roll 10 or also through special sliding contacts. The scoring device 12 on the other hand must be separate from the body of the apparatus in order to prevent a flow of current through the cutters of the scoring device. The flow of current between the multiple conductor strip 11 and the electrode 15 produces an oxidation and thus, in a suitable electrolyte, a dissolution of the metal at the places indicated in FIG. 5. The speed of the strip depends on the thickness of metal in the strip 23 and the desired width of the cavities 27 to be etched out. In the case of Example 1 the strip speed was 1.5 m/min., for a width of the etched out cavity of approx. 0.1 mm. In the case of Example 2 a treatment time of 15 seconds at higher voltage and current values was used for a cavity of 0.2 – 0.3 mm width. A similar treatment time was used in Example 3, whereas in Example 4 the throughput speed amounted to 5 m/min. and a length of the etching bath 13 of 0.35 m was necessary.

From the examples it is to be noted further that the current densities are very high, at around 750–1300 A/dm$^2$. In general it can be seen that the high current densities are advantageous since they produce a smoother shape of the edges of the etched-out cavities.

The height of current densities which can be used, can lead to unacceptable heating of the strip, if the individual conductors become relatively narrow, since then smaller cross sections are available for the same current. In this case it is advantageous not to undertake the supply of the electric current as described in connection with FIG. 1, but by means of an electrolytic coupling according to FIG. 2. The coupling bath 28 is filled either with the same electrolyte as the etching bath, or with one preferably more simply or cheaply composed, while the only condition that has to be met is that any ions entrained into the etching bath 13 do not interfere with the etching process. Otherwise the bath would have to be arranged in sequence after the etching bath. The coupling bath 28 is fitted with an auxiliary anode 29. This and the cathodically connected electrode 15 are connected accordingly to the poles of the direct current source. The metal strip to be treated thus completes the circuit and again forms the anode in the etching bath 13. In this way it is achieved that only the short piece of the strip 11 on the way from the coupling bath 28 to the etching bath 13 remains uncooled. Thus inadmissible heatings, which can lead to a damaging of the final product, can be avoided.

Figure 6:
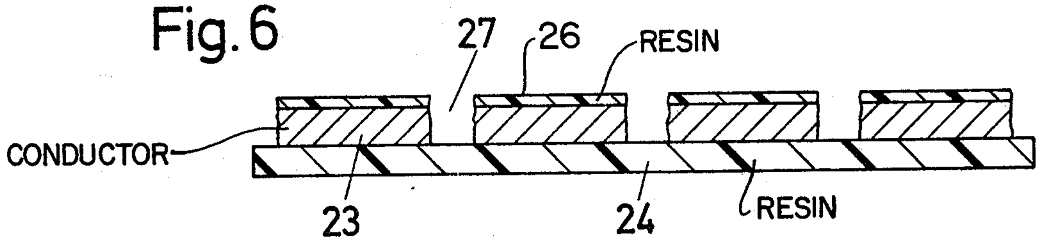
Figure 7:
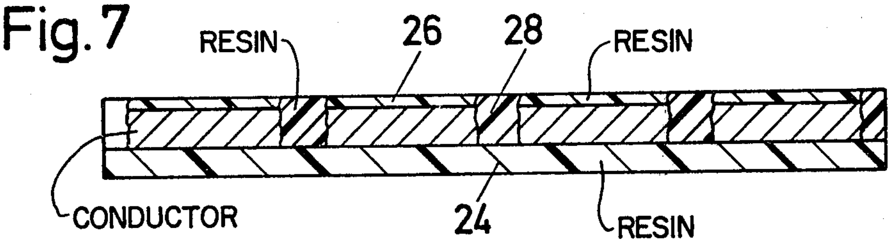

FIG. 6 represents the strip after its treated side has been brushed in order to remove the edges of lacquer projecting over the etched grooves and FIG. 7 shows the strip with recesses filled up with insulating material 28.

What is claimed is:

1. A method of making a strip-shaped multiple electric conductor having very small breadths and cross-sections, comprising the steps of, providing a strip of electrically conducting material, applying a first layer of a first insulating material to one wide side of the strip and a second layer of a second insulating material to the other wide side of the strip, mechanically removing the first insulating material of the first layer above the strip to define at least one groove penetrating so far as to expose the conducting material, removing the exposed conducting material throughout its thickness to the top of the second layer, so as to form at least one longitudinal cavity in the strip, and filling the cavity and the groove with a third insulating material.

2. The method according to claim 1, in which the groove is provided by the removal of a part of the first layer.

3. The method according to claim 2 in which the removal of the first insulating material of the first layer is carried out by means of a knife.

4. The method according to claim 1, in which the removal of the exposed conducting material is carried out by electrolytic etching.

5. The method according to claim 1, in which the third insulating material used for filling the cavity and groove is a lacquer dissolved in a liquid medium, further comprising the steps of drying the lacquer and baking it.

6. The method according to claim 1, in which the third insulating material used for filling the cavity and groove is a polymeric organic cross-linkable resin, further comprising the step of applying heat to harden the resin.

7. The method according to claim 1, including a subsequent step of covering the multiple conductor with a thermoplastic synthetic resin by an extrusion coating operation.

8. The method as claimed in claim 1, wherein the first insulating material is removed to define a plurality of the grooves.

* * * * *